United States Patent
Abl

(10) Patent No.: US 9,594,158 B2
(45) Date of Patent: Mar. 14, 2017

(54) METHOD AND APPARATUS FOR CAPTURING AN IMAGE OF A SPEED-VIOLATING VEHICLE

(71) Applicant: Kapsch TrafficCom AG, Vienna (AT)

(72) Inventor: Alexander Abl, Viktring (AT)

(73) Assignee: Kapsch TrafficCom AG, Vienna (AT)

( * ) Notice: Subject to any disclaimer, the term of this patent is extended or adjusted under 35 U.S.C. 154(b) by 152 days.

(21) Appl. No.: 13/964,894

(22) Filed: Aug. 12, 2013

(65) Prior Publication Data

US 2014/0055298 A1    Feb. 27, 2014

(30) Foreign Application Priority Data

Aug. 22, 2012   (EP) .................................. 12181280

(51) Int. Cl.
  *G01S 13/00* (2006.01)
  *G01S 13/66* (2006.01)
  *G08G 1/054* (2006.01)
  *G01S 13/86* (2006.01)

(52) U.S. Cl.
  CPC ............ *G01S 13/66* (2013.01); *G01S 13/867* (2013.01); *G08G 1/054* (2013.01)

(58) Field of Classification Search
  None
  See application file for complete search history.

(56) References Cited

U.S. PATENT DOCUMENTS

| 5,801,943 | A | 9/1998 | Nasburg |
| 6,081,206 | A | 6/2000 | Kielland et al. |
| 6,754,368 | B1* | 6/2004 | Cohen .................. G01S 7/4008 348/143 |
| 7,095,854 | B1* | 8/2006 | Ginter .................... G06F 21/10 380/231 |

(Continued)

FOREIGN PATENT DOCUMENTS

| AT | 8939 U1 | 2/2007 |
| DE | 102005036562 A1 | 2/2007 |

(Continued)

OTHER PUBLICATIONS

Extended European Search Report received for application No. 12181280.4 dated Feb. 6, 2013, 5 pages.

(Continued)

*Primary Examiner* — Dakshesh Parikh
(74) *Attorney, Agent, or Firm* — Fiala & Weaver P.L.L.C.

(57) ABSTRACT

Methods and devices are provided for recording images of vehicles that pass through a section between an entrance and an exit at excessive speed, comprising the following steps: capturing an entry time of a vehicle at the entrance, generating a unique object identifier for the vehicle and storing the entry time under the object identifier; tracking the movement of the vehicle, which is being continuously referenced by way of the object identifier, over the entire section using a sensor arrangement; capturing an exit time of the vehicle that is referenced by way of the object identifier at the exit; and if a comparison of the captured exit time to the stored (Continued)

entry time indicates a speed that exceeds a threshold value: determining an entry image stored under the object identifier or creating an exit image of the vehicle.

14 Claims, 2 Drawing Sheets

(56) References Cited

U.S. PATENT DOCUMENTS

| | | | |
|---|---|---|---|
| 7,505,997 | B1 * | 3/2009 | Gelf .................. G06F 17/30982 |
| 2002/0141618 | A1 | 10/2002 | Ciolli et al. |
| 2003/0005464 | A1 | 1/2003 | Gropper et al. |
| 2004/0218052 | A1 | 11/2004 | DiDomenico et al. |
| 2010/0302362 | A1 * | 12/2010 | Birchbauer ............ G08G 1/054 348/135 |
| 2011/0313644 | A1 * | 12/2011 | Grassi .................... G06K 9/723 701/119 |
| 2012/0001737 | A1 | 1/2012 | Berger et al. |

FOREIGN PATENT DOCUMENTS

| | | |
|---|---|---|
| DE | 102007059346 A1 | 6/2009 |
| EP | 978811 A2 | 2/2000 |
| EP | 1220181 A1 | 7/2002 |
| EP | 2469497 A1 | 6/2012 |
| WO | 2008041210 A1 | 4/2008 |

OTHER PUBLICATIONS

Office action received for Chilean patent application No. 2011-003242, issued approximately May 27, 2014, 6 pages.
Chilean patent application No. 201001007, filed on Sep. 27, 2010, 19 pages.
Final Office Action Received for U.S. Appl. No. 13/330,379, Mailed on Apr. 1, 2015, 17 Pages.
Non Final Office Action Received for U.S. Appl. No. 13/330,379, Mailed on Aug. 4, 2015, 16 pages.
Extended European Search Report received for European Patent Application No. 10450197.8, mailed on Jun. 8, 2011, 4 pages.
Albrecht, "Section Control in Germany", Road Traffic Act, journal for lawyers specialising in road traffic matters, 2009, 7 pages.
Non-Final Office Action Received for U.S. Appl. No. 13/330,379, mailed on May 16, 2016, 18 pages.
Final Office Action received for U.S. Appl. No. 13/330,379, mailed on Oct. 26, 2016, 20 pages.

* cited by examiner

METHOD AND APPARATUS FOR CAPTURING AN IMAGE OF A SPEED-VIOLATING VEHICLE

CROSS-REFERENCE TO RELATED APPLICATION(S)

This application claims priority to European Patent Application No. 12 181 280.4, filed on Aug. 22, 2012, the entirety of which is incorporated by reference herein.

BACKGROUND

Technical Field

The present patent application relates to a method and to a device for recording images of vehicles that pass a section between an entrance and an exit at excessive speed.

Background Art

Certain traffic monitoring tasks require images to be recorded of a vehicle as preservation of evidence for enforcing traffic violations. Examples include the so-called "Section Control" or "Point-to-Point" speed monitoring, in which the times at which a vehicle enters and exits the section segment passed through by the vehicle are measured and used to determine the speed. The traffic monitoring systems employed for this purpose must comply with strict data protection stipulations so as to exclude an impermissible creation of movement profiles of the motorists to an extent as great as possible. For example, for section control to be carried out, legal regulations in Austria and Germany require that a lasting identification of a vehicle and the passage data thereof is only permitted when speeding exists.

Previously known systems attempt to satisfy these data protection requirements by deleting, without a trace, all the recorded data within a guaranteed time period, for example 8 minutes, after the vehicle has been identified at the entrance and exit and a speed has been measured based thereon, if no speed violation exists (see F. Albrecht, "Section Control in Deutschland" (Section Control in Germany), Traffic Law, Zeitschrift füdie Praxis der Verkehrsjuristen, 2009). This procedure continues to entail uncertainties because the vehicle is identified at the entrance based on a unique vehicle license plate number and must be recognized at the exit based on the same vehicle license plate number. However, the vehicle license plate number allows an unambiguous conclusion of the vehicle owner, which violates the privacy of this owner.

BRIEF SUMMARY

It is the object of the present application to create methods and devices for recording images of vehicles that pass through a section at excessive speed which offer the greatest possible data protection with regard to the sensitive passage data, in particular the identity of the passing vehicle.

This object is achieved in a first aspect by a method of the type mentioned above, comprising the following steps:
capturing the entry time of a vehicle at the entrance, generating a unique object identifier for the vehicle and storing the entry time under the object identifier;
tracking the movement of the vehicle, which is being continuously referenced by way of the object identifier, over the entire section using a sensor arrangement;
capturing the exit time of the vehicle referenced by way of the object identifier at the exit; and
if a comparison of the captured exit time to the stored entry time indicates a speed that exceeds a threshold value: capturing an exit image of the vehicle at the exit.

An alternative embodiment of the method comprises the following steps:
capturing an entry image and the entry time of a vehicle at the entrance, generating a unique object identifier for the vehicle and storing the entry image and the entry time under the object identifier in a memory;
tracking the movement of the vehicle, which is being continuously referenced by way of the object identifier, over the entire section using a sensor arrangement;
capturing the exit time of the vehicle referenced by way of the object identifier at the exit;
determining the entry time stored under the object identifier from the memory; and
if a comparison of the captured exit time to the determined entry time indicates a speed that exceeds a threshold value: determining the entry image stored under the object identifier;
Otherwise, if the comparison of the captured exit time to the stored entry time does not indicate a speed that exceeds a threshold value: deleting the entry image stored under the object identifier.

Embodiments are based on an entirely new approach for sectional speed control ("Section Control"), which is no longer based on the identification of the vehicle at the entrance and recognition of the vehicle based on the identification thereof at the exit, but on uninterrupted tracking of the vehicle passing through the section. During tracking, the vehicle is solely referenced by way of an arbitrary anonymous object identifier, which is assigned independently of the actual identity or features of the vehicle. This completely protects the privacy of a vehicle passing through the section if no violation exists, which is to say if no speeding can be established. Only if a violation exists will the entry image, on which the vehicle can be visually identified, be searched in the memory based on the object identifier or an exit image be generated; in contrast, the entry images of "non-violating" object identifiers are not searched in the memory, but are deleted immediately, or no exit images are generated at all for non-violating vehicles. As a result, the privacy of non-violating vehicles remains completely protected, while achieving effective section control, including the recording of images, for violating vehicles.

The movement of the vehicle over the section can be tracked in all manners that are known in technology. According to one embodiment, radar technology is employed for this purpose, and more particularly a sensor arrangement comprising at least two radar devices, which contiguously capture the section without interruption and in the radar images of which the vehicle is detected and tracked. Examples of such sensor arrangements for monitoring traffic flow at the granularity level of individual vehicles include the radar traffic monitoring systems sold by Navtech under the ClearWay® brand, or by SMS smart microwave sensors GmbH as "Traffic Radar". These systems can track vehicle movements based on object identifiers assigned to the vehicles by way of the radar images of several consecutive sensors and can thus be used, by way of example, for implementations.

In an alternative embodiment, the tracking can be carried out using a sensor arrangement comprising at least two cameras contiguously capturing the section without interruption, in the camera images of which the vehicle is detected and tracked. For example, image processing-based video traffic monitoring systems can be employed for this purpose, such as those described in the documents CN 101800890 A, CN 101593422 A, CN 102254429 A, TW 200905619 A and TW 200905620 A.

In the second embodiment in which entry images are generated, images of violating vehicles may additionally be recorded at the exit, while non-violating vehicles remain unaffected. To this end, according to a further embodiment, an exit image of the vehicle is captured and stored together with the exit time, and this exit image is immediately deleted again if the described comparison does not indicate a speed that exceeds the threshold value. In an alternative embodiment, an exit image of the vehicle is only captured and stored if said comparison indicates a speed that exceeds the threshold value.

The use of entry and exit images for violating vehicles in conjunction with the corresponding entry and exit times yields sound data record evidence if a violation exists, which can be used for the enforcement of traffic violations. For this purpose, the entry image and the entry time may be stored as an entry data record, and the exit image and the exit time are stored as an exit data record, and if said comparison indicates a speed that exceeds the threshold value, the entry data record and the exit data record are output, and if no speeding is indicated, the entry data record and the exit data record are deleted.

As described, the object identifier assigned to a vehicle at the entrance and used for tracking is completely separate from the actual identity of the vehicle. The object identifier may be randomly selected for this purpose, or may be consecutively taken from a sequence of unique identifiers. Both variants provide maximum protection of the privacy or anonymity of the passing vehicles.

In a second aspect, an embodiment can achieve the objects by way of a device for recording images of vehicles that pass through a section between an entrance and an exit at excessive speed, comprising:

a first timekeeper unit disposed at the entrance for capturing the entry time of a vehicle;

a processor for generating a unique object identifier for the vehicle and storing the entry time under the object identifier in a memory;

a sensor arrangement, which receives the object identifier from the processor and tracks the vehicle that is referenced by way of the object identifier over the entire section;

a second timekeeper unit disposed at the exit for capturing the exit time of the vehicle that is referenced by way of the object identifier; and an evaluation unit, which is configured to determine the entry time stored under the object identifier and, if a comparison of the captured exit time to the determined entry time indicates a speed that exceeds a threshold value, generating an exit image of the vehicle by way of a second camera disposed at the exit.

In an alternative embodiment, an embodiment can achieve the objects by way of:

a first camera and a first timekeeper unit disposed at the entrance for capturing an entry image and the entry time of a vehicle;

a processor for generating a unique object identifier for the vehicle and storing the entry image and the entry time under the object identifier in a memory;

a sensor arrangement, which receives the object identifier from the processor and tracks the vehicle that is referenced by way of the object identifier over the entire section;

a second timekeeper unit for capturing the exit time of the vehicle that is referenced by way of the object identifier; and an evaluation unit, which is configured to determine the entry time stored under the object identifier from the memory and, if a comparison of the captured exit time to the determined entry time indicates a speed that exceeds a threshold value, determining the entry image that is stored under the object identifier, or otherwise deleting the entry image that is stored under the object identifier.

BRIEF DESCRIPTION OF THE DRAWINGS/FIGURES

With regard to the advantages and further characteristics of the devices according to the invention, reference is made, per analogiam, to the above descriptions of the methods, and the description below of embodiments, which is provided with reference to the accompanying drawings, in which.

Embodiments will now be described with reference to the accompanying drawings.

DETAILED DESCRIPTION

Figure 1:
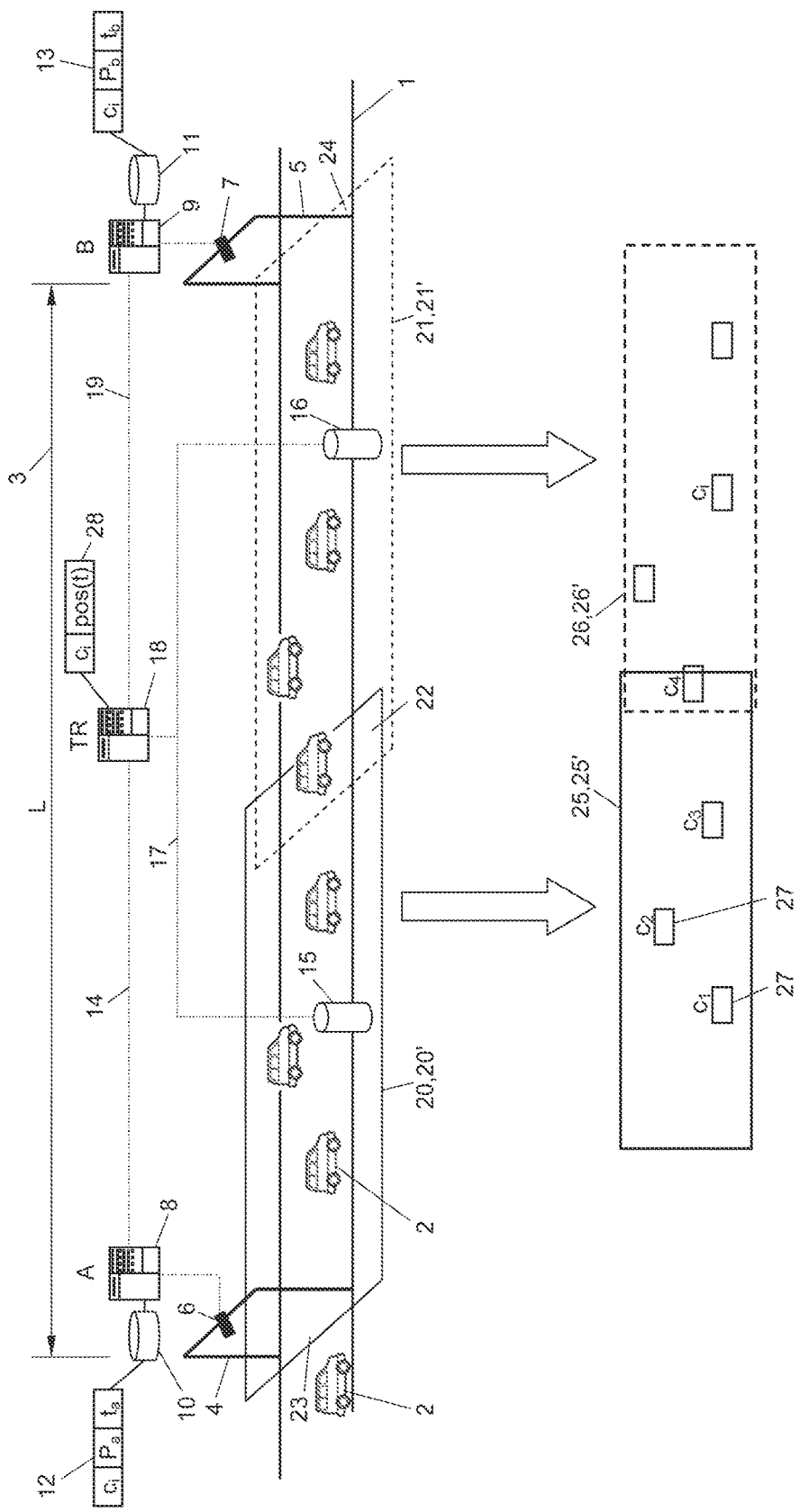
FIG. 1 shows a block diagram of the devices in conjunction with a schematic illustration of a speed measurement section ("Section Control"), according to an example embodiment.

FIG. 1 shows a road 1, on which vehicles 2 pass through a section 3 having a known length L between an entrance 4 and an exit 5. An entrance station A is arranged at the entrance 4 of the section 4, and an exit station B is arranged at the exit 5.

The entrance and exit stations A, B each comprise at least one camera 6, 7 and a station processor 8, 9 connected thereto, the processor having a memory 10, 11. The cameras 6, 7—in cooperation with the station processors 8, 9—are configured to record an entry image $P_a$ of a vehicle 2 passing the entrance 4 and an exit image $P_b$ of a vehicle 2 passing the exit 5.

The cameras 6, 7 can record a vehicle 2 arbitrarily from the front, obliquely from the side, or from behind; in any case, they create the entry and exit images $P_a$, $P_b$ so that a unique vehicle characteristic, such as the official license plate number, license plate, or another unique feature of the vehicle 2 or the like, can be visually identified in the images $P_a$, $P_b$.

The cameras 6, 7 can be photographic cameras, which each record an individual image $P_a$, $P_b$ and the image recording of which can be triggered by a corresponding vehicle detection unit (not shown), such as a light barrier, an induction loop installed in the roadway, a radar, laser, LIDAR or other vehicle detection sensor, or the like. The cameras 6, 7 can also be video cameras and the detection of a vehicle 2 can take place, for example, by way of appropriate image processing algorithms using output video streams of the cameras 6, 7 so as to detect the appearance of a vehicle 2 therein and isolate an individual image $P_a$, $P_b$ or an image sequence therefrom; such image sequences are hereafter also summarized under the general concepts of "entry image $P_a$" and "exit image $P_b$".

Concurrently with the capturing of the entry or exit image $P_a$, $P_b$ of a vehicle passing the entrance or exit 4,5, the respective current time (time on a clock, Greenwich mean time, system time or the like) is captured as the entry time $t_a$ or exit time $t_b$. The entry and exit times $t_a$, $t_b$ can, for example, be added to the entry and exit images $P_a$, $P_b$ as time stamps from the cameras 6, 7 or from the station processor 8, 9 or taken directly from a time code of the video streams of the cameras 6, 7.

In the entrance station A, the entry image $P_a$ and the entry time $t_a$ are stored in the memory 10 as an entry data record 12 for evidence purposes, and the exit image $P_b$ and the exit time $t_b$ are stored as an exit data record 13 in the memory 11 in the exit station B. So as to retrieve the entry data record 12 of a vehicle 2, the station processor 8 of the entrance station A assigns a unique object identifier $c_1, c_2, \ldots$, or generally $c_i$, to every entering vehicle 2, the identifier being stored together with the entry data record 12, and more particularly such that the entry data record 12 can be accessed or retrieved from the memory 10 under this object identifier $c_i$.

The object identifier $c_i$ can be of any arbitrary kind as long as it is unique, and it is separate of and independent from the actual identity of the vehicle 2, for example from the vehicle license plate number. More precisely, the identifier only needs to be unique for the maximum number of vehicles 2 that can be located at any given time on section 3 because the object identifier $c_i$ of an exiting vehicle 2 could subsequently be used again for an entering vehicle 2. The object identifiers $c_i$ may be assigned as random values; alternatively, they could be taken consecutively from a sequence (list) of predetermined identifiers that are unique in each case.

After entering the section 3, every vehicle 2 is thus identified by the object identifier $c_i$ assigned thereto. The object identifier $c_i$ is transferred by the entrance station A to a sensor arrangement or a tracking system TR, for example via a wired or wireless data path 14, as will be described in greater detail below based on FIG. 2.

In the example shown in FIG. 1, the sensor arrangement TR comprises two or more radar devices 15, 16, which are set up consecutively along the section 3, and a tracking processor 18 connected to the devices via a data network 17, the processor in turn being connected via the data path 14 to the entrance station A and via a further data path 19 to the exit station B. Of course, any two or all three of the components station processor 8, tracking processor 18 and station processor 9 could also be implemented in a single physical unit.

Each radar device 15, 16 has a dedicated detection range 20, 21, wherein the detection ranges 20, 21 of all radar devices 15, 16 of the sensor arrangement TR cover the entire section 3 without interruption, and in the present case even partially overlap at 22 and go beyond the entrance and exit 4, 5 at 23 and 24.

The bottom half of FIG. 1 schematically shows the "radar images" 25, 26, which are created by the radar devices 15, 16 for the respective detection range 20, 21 and in which the vehicles 2 detected therein by way of radar are identified as "targets" or symbolic objects 27 having the respective object identifier $c_i$. Examples of such multisensor radar tracking systems for traffic monitoring tasks, which also conduct a "handover" of the object identifiers $c_i$ of the tracked objects 27 from one sensor 15 to the next sensor 16, which is to say from one radar image 25 to the next radar image 26, include, for example, the traffic monitoring systems sold by Navtech under the ClearWay® designation or by SMS smart microwave sensors GmbH as "Traffic Radar".

The sensor arrangement TR thus has precise knowledge, at any given time, of the current position pos(t) of an object 27 having the object identifier $c_i$ on the road 3, see also the data record 28 in the tracking processor 18 shown by way of example. When the exit 5 of the exit station B has been reached, the sensor arrangement TR is thus able to communicate, via the path 19, the object identifier $c_i$ of the vehicle 2 that is in the process of passing the exit 5. The station processor 9 of the exit station B can then request the entry time $t_a$ of this vehicle 2 from the entrance station A based on the object identifier $c_i$ received about an exiting vehicle 2—or may have already received this from the entrance station A together with the object identifier $c_i$—and establish speeding of the vehicle 2 for the passage of the section 3 by comparing the entry and exit times $t_a$, $t_b$, as will now be described in greater detail based on FIG. 2.

Figure 2:
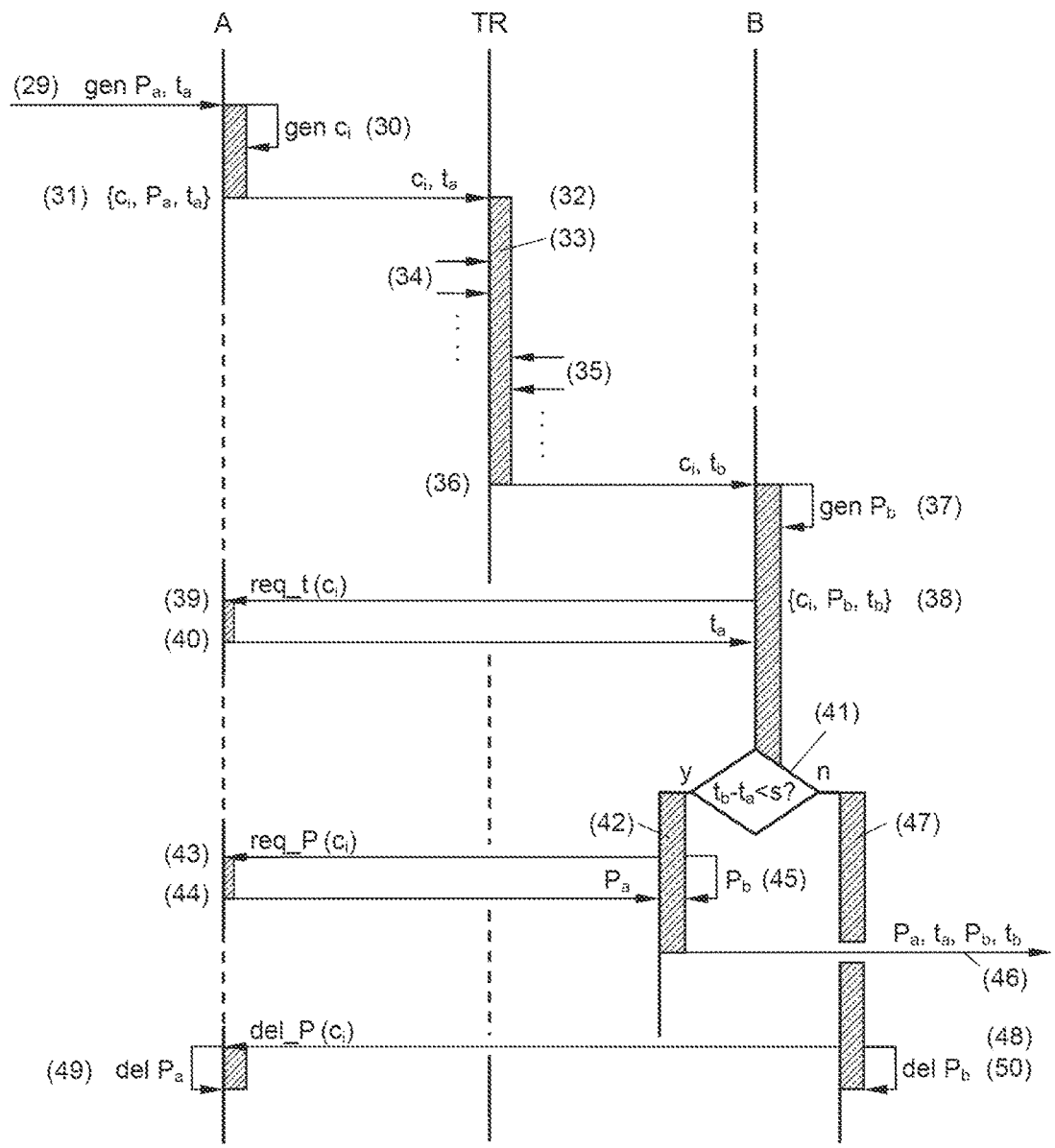
FIG. 2 shows a sequence diagram of the method, according to an example embodiment.

FIG. 2 shows the entire method in the form of a flow and sequence chart. The method is triggered by the detection of a vehicle 2 in the entrance station A, whereby the entry image $P_a$ (this is optional, see below) and the entry time $t_a$ are captured (step 29). The entrance station A, for example the station processor 8 thereof, generates the object identifier $c_i$ for the entering vehicle 2 in step 30 and stores the entry data record 12 comprising the object identifier $c_i$, the (optional) entry image $P_a$ and the entry time $t_a$ in the memory 10 (step 31).

In step 32, the object identifier $c_i$—optionally together with the entry time $t_a$, so as to facilitate the association—is transferred to the sensor arrangement TR, whereupon the arrangement starts an individual tracking process 33 for the object identifier $c_i$. Over the course of the tracking process 33, the sensor arrangement TR, in particular the tracking processor 18 thereof, continuously receives data from the wide variety of sensors 15, 16, see steps 34, 35.

As soon as the sensor arrangement TR establishes that the vehicle 2 or object 27 having the object identifier $c_i$ is reaching or passing the exit 5, the arrangement, in step 36, transfers this object identifier $c_i$—optionally together with the exit time $t_b$—to the exit station B. The exit time $t_b$ could alternatively also be captured directly by the exit station B.

In step 37, the exit station B generates the exit image $P_b$ of the exiting vehicle 2. Step 37 may be eliminated in an alternative embodiment or may not be carried out until later, after a violation has been established.

The exit station B now has the object identifier $c_i$ of the vehicle 2 that is in the process of exiting at its disposal and in step 38 can store this, together with the exit image $P_b$ and the exit time $t_b$, in the memory 11 as the exit data record 13. This may optionally also not take place until a violation has been established.

In step 39, the exit station B uses the command req_t($c_i$) to request the entry time $t_a$ that is stored in the entrance station A for the object identifier $c_i$, and more precisely it requests this from the entry data record 12 stored in the memory 10. The entrance station A responds in step 40 by returning the desired entry time $t_a$ for the object identifier $c_i$. Step 40 may also be carried out with prior request from the entrance station A.

In the comparison or decision step 41, the exit station B, more precisely the station processor 9 thereof as the evaluation unit, can compare the entry time $t_a$ to the exit time $t_b$ so as to establish whether the vehicle 2 having the object identifier $c_i$ passed the section 3 at too fast a speed. The comparison can take place, for example, by checking whether the difference between the exit time $t_b$ and entry time $t_a$ is below a predetermined threshold value s, which represents the shortest period of time that the vehicle 2 may take to pass through the section 3. If the vehicle was faster than the maximum speed allowed on section 3, then the difference $t_b - t_a$ will be smaller than this permissible minimum time s, and the speed was exceeded ("speed violation"), see branch "y" of decision step 41. However, if the vehicle 2 was slower than the allowed maximum speed, no violation exists and the other branch "n" of the decision 41 is pursued.

Instead of a time difference comparison, it is also possible, of course, to directly calculate the speed of the vehicle based on the length L of the section 3 from the known relationship $$v=L/(t_b-t_a)$$

and to compare this, in step 41, to an allowed maximum speed.

If a violation exists (branch "y" of the decision 41 or track 42), the exit station B in step 43 uses the request command req_P($c_i$) to request the entry image $P_a$ stored under the object identifier $c_i$ from the entrance station A, or more precisely from the entry data record 12 in the memory 10. In step 44, the entrance station A responds by returning the entry image $P_a$ or the entire entry data record 12 to the exit station B. In the optional step 45, the exit image $P_b$, which was already created in step 37, can be determined in the exit station B from the exit data record 13 or the entire exit data record 13. As an alternative, if step 37 (and optionally also step 38) were eliminated, the exit image $P_b$ could also not be generated by the camera 7 until step 45, and then (optionally) be stored as the exit data record 13, together with the exit time $t_b$. According to another variant, no entry image $P_a$ was generated in the entrance station A, and thus steps 43, 44 are eliminated, and an exit image $P_b$ of the vehicle 2 is only generated in step 45 if a violation exists 42, which is to say no entry image $P_a$ exists.

If a violation exists 42, the exit station B now has all the data for enforcing the speed violation, which is to say the entry image $P_a$ and/or the exit image $P_b$, perhaps supplemented by one or both times $t_a$, $t_b$, and optionally the entire entry data record 12 and the entire exit data record 13, and can output this data in step 46, for example to a display or by sending it to a traffic monitoring back office, authority, a control device of the executive force or the like.

If no violation exists (branch "n" of the decision 41 or track 47), the exit station B in step 48 sends a deletion command del_P($c_i$) to the entrance station A with regard to the object identifier $c_i$, whereupon the entrance station A in step 49 irrevocably deletes the entry image $P_a$ stored under the object identifier $c_i$, optionally even the entire entry data record 12, from the memory 10. Similarly, the exit station B itself can also irretrievably delete the exit image $P_b$ in step 50, if the station created such an image. If an exit data record 13 was stored in the database 11, this will be completely deleted in step 50. If no entry image $P_a$ was created, steps 48 and 49 are eliminated.

The memory 10 is optionally protected from unauthorized data access to the entry image $P_a$ so that the memory outputs the entry image $P_a$ only upon adherence to the chronological sequence of method steps 39 and 43, and/or only outputs this to an entity identifying itself appropriately by way of cryptographic certificates, signatures, encryptions, such as—in the present case—the station processor 9 of the exit station B.

Instead of the radar devices 15, 16 shown in FIG. 1, the sensor arrangement TR can also operate based on another movement tracking technology. For example, two or more cameras could be set up instead of the radar devices 15, 16 along the section 3, which have optical detection ranges 20', 21' so as to image the section 3 without interruptions in the camera images 25', 26' thereof. The vehicles 2 or objects 27 can then be detected in the camera images 25', 26' using appropriate image processing methods and the movements thereof could be tracked by referencing them based on the object identifiers $c_i$.

Other types of sensor arrangements TR are also conceivable, for example a chain of light barriers, which is disposed along the section 3 and able to track vehicles moving thereon; a chain of inductive sensors, proximity sensors, laser scanners and the like, in the entire captured images of which the moving vehicles 2 can be detected as moving objects 27 and the movements thereof can be tracked over the entire section 3.

CONCLUSION

The invention is thus not limited to the shown embodiments, but encompasses all variants and modifications that are covered by the scope of the accompanying claims. While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the described embodiments should not be limited by any of the above-described exemplary embodiments, but should be defined only in accordance with the following claims and their equivalents.

What is claimed is:

1. A method for recording images of vehicles that pass through a section between an entrance and an exit at excessive speed, comprising the following steps:

capturing, by a first station processor at the entrance, an entry image and the entry time of a vehicle at the entrance, generating a unique object identifier for the vehicle and storing the entry image and the entry time under the object identifier, wherein the generated object identifier is independent from the identity of the vehicle and is at least one of a randomly-selected value or taken from a list of predetermined identifiers;

tracking the movement of the vehicle, which is being continuously referenced during the tracking by way of the object identifier, over the entire section using a sensor arrangement wherein the sensor arrangement transfers the object identifier to an exit station when the sensor arrangement establishes that the vehicle reaches the exit;

capturing, by a second station processor at the exit, the exit time of the vehicle that is referenced by way of the object identifier at the exit; and if a comparison of the captured exit time to the stored entry time indicates a speed that exceeds a threshold value: determining the entry image stored under the object identifier;

otherwise: sending, by the second station processor, a command to the first station processor that causes the first station processor to delete the entry image stored under the object identifier.

2. The method according to claim 1, wherein the tracking is carried out using a sensor arrangement comprising at least two radar devices, which contiguously capture the section without interruption and in the radar images of which the vehicle is detected and tracked.

3. The method according to claim 1, wherein the tracking is carried out using a sensor arrangement comprising at least two cameras, which contiguously capture the section without interruption and in the camera images of which the vehicle is detected and tracked.

4. The method according to claim 1, wherein an exit image of the vehicle is captured and stored together with the exit time, and the exit image is deleted if said comparison indicates no speed that exceeds the threshold value.

5. The method according to claim 4, wherein the entry image and the entry time are stored as an entry data record and the exit image and the exit time are stored as an exit data record, and if said comparison indicates a speed that exceeds the threshold value, the entry data record and the exit data record are output, and if no speeding is indicated, the entry data record and the exit data record are deleted.

6. The method according to claim 1, wherein an exit image of the vehicle is captured and stored only if said comparison indicates a speed that exceeds the threshold value.

7. The method according to claim 6, wherein the entry image and the entry time are stored as an entry data record and the exit image and the exit time are stored as an exit data record, and if said comparison indicates a speed that exceeds the threshold value, the entry data record and the exit data record are output, and if no speeding is indicated, the entry data record and the exit data record are deleted.

8. The method according to claim 1, wherein the generated object identifier is a randomly selected value.

9. The method according to claim 1, wherein the object identifier is consecutively taken from a sequence of unique identifiers.

10. A device for recording images of vehicles that pass through a section between an entrance and an exit at excessive speed, comprising:
a first camera disposed at the entrance for capturing an entry image;
a processor disposed at the entrance for generating a unique object identifier for the vehicle and storing the entry image and an entry time captured for the vehicle under the object identifier in a memory, wherein the generated object identifier is independent from the identity of the vehicle and is at least one of a randomly-selected value or taken from a list of predetermined identifiers;
a sensor arrangement, which receives the object identifier from the processor and tracks the vehicle that is referenced by way of the object identifier over the entire section, wherein the sensor arrangement transfers the object identifier to an exit station when the sensor arrangement establishes that the vehicle reaches the exit; and
an evaluation unit disposed at the exit, which is configured to determine the entry time stored under the object identifier and, if a comparison of a captured exit time of the vehicle that is referenced by way of the object identifier to the determined entry time indicates a speed that exceeds a threshold value, determine the entry image stored under the object identifier, or otherwise send a command to the processor disposed at the entrance that causes the processor to delete the entry image stored under the object identifier.

11. The device according to claim 10, wherein the sensor arrangement comprises at least two radar devices contiguously capturing the section without interruption and is configured to detect and track the vehicle in the radar images of the radar devices.

12. The device according to claim 10, wherein the sensor arrangement comprises at least two cameras contiguously capturing the section without interruption and is configured to detect and track the vehicle in the camera images of the cameras.

13. The device according to claim 10, characterized by a second camera disposed at the exit for capturing an exit image of the vehicle, wherein the evaluation unit is configured to delete the exit image if said comparison does not indicate a speed that exceeds the threshold value.

14. The device according to claim 10, wherein the evaluation unit is configured to capture an exit image of the vehicle using a second camera disposed at the exit if said comparison indicates a speed that exceeds the threshold value.

* * * * *